United States Patent
Pelissier et al.

(10) Patent No.: US 11,868,551 B1
(45) Date of Patent: Jan. 9, 2024

(54) SYSTEM AND METHOD FOR CUSTOMIZED USER INPUT

(71) Applicant: Dell Products L.P., Round Rock, TX (US)

(72) Inventors: Gerald Rene Pelissier, Mendham, NJ (US); Michiel Sebastiaan Emanuel Petrus Knoppert, Amsterdam (NL); Loo Shing Tan, Singapore (SG); Thomas Marcus Hinskens, Utrecht (NL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/181,115

(22) Filed: Mar. 9, 2023

(51) Int. Cl.
*G06F 3/038* (2013.01)
*G06F 3/01* (2006.01)
*G06F 3/0346* (2013.01)
*G06F 3/033* (2013.01)

(52) U.S. Cl.
CPC ............. *G06F 3/038* (2013.01); *G06F 3/011* (2013.01); *G06F 3/0334* (2013.01); *G06F 3/0346* (2013.01)

(58) Field of Classification Search
CPC ........ G06F 3/038; G06F 3/011; G06F 3/0334; G06F 3/0346
See application file for complete search history.

(56) References Cited

U.S. PATENT DOCUMENTS

| | | | |
|---|---|---|---|
| 8,368,649 B2 | 2/2013 | Hall | |
| 8,654,095 B1 | 2/2014 | Cho et al. | |
| 9,323,356 B2 | 4/2016 | Kuo | |
| 10,719,145 B1 | 7/2020 | Files et al. | |
| 11,809,646 B1 * | 11/2023 | Knoppert | G06F 3/038 |
| 2005/0083316 A1 | 4/2005 | Brian et al. | |
| 2006/0205368 A1 | 9/2006 | Bustamante et al. | |
| 2010/0053085 A1 | 3/2010 | Hall | |
| 2013/0314338 A1 | 11/2013 | Nam et al. | |
| 2014/0267150 A1 | 9/2014 | Masashi | |
| 2015/0277598 A1 | 10/2015 | Aurongzeb et al. | |
| 2016/0299606 A1 | 10/2016 | Go | |
| 2016/0313819 A1 | 10/2016 | Ancona et al. | |
| 2019/0113966 A1 | 4/2019 | Connellan et al. | |
| 2019/0187856 A1 | 6/2019 | Bruwer et al. | |
| 2019/0339776 A1 | 11/2019 | Rosenberg et al. | |
| 2020/0004346 A1 | 1/2020 | Vlasov et al. | |
| 2020/0371625 A1 | 11/2020 | Katsurahira et al. | |

* cited by examiner

*Primary Examiner* — Abhishek Sarma
(74) *Attorney, Agent, or Firm* — Womble Bond Dickinson (US) LLP

(57) ABSTRACT

Methods and systems for providing computer implemented services using user input are disclosed. To obtain the user input, a human interface device may be used. Interpretation of actuation of the human interface device may be customized to the types of actuations that users are able to perform. To customize the types of the actuations, users may perform actuations of the human interface device for various types of user input to establish associations between the actuations and the user input. The associations may be used to train an inference model usable to identify user input based on performed actions of the human interface device.

20 Claims, 12 Drawing Sheets

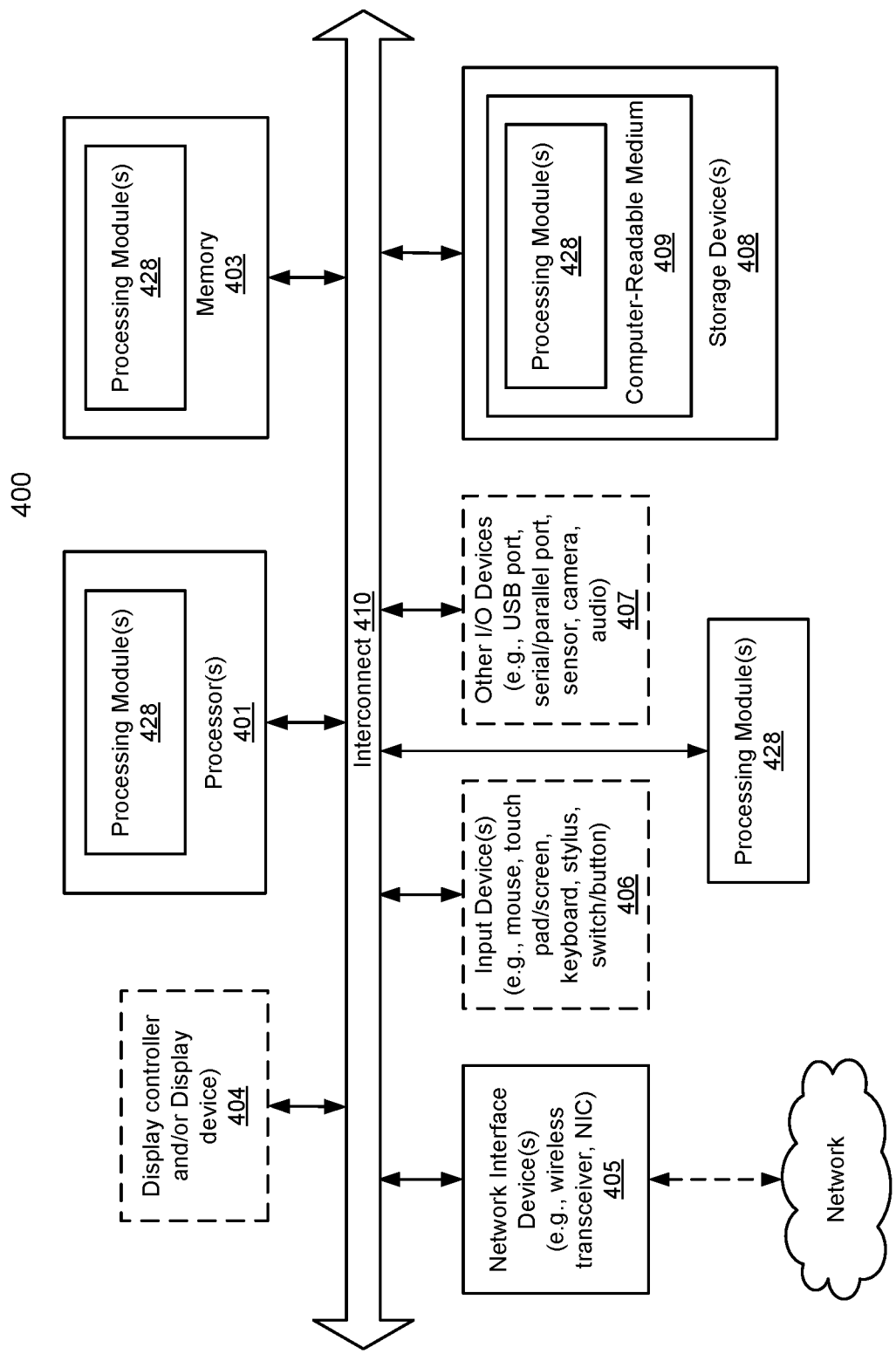

SYSTEM AND METHOD FOR CUSTOMIZED USER INPUT

FIELD

Embodiments disclosed herein relate generally to user input. More particularly, embodiments disclosed herein relate to systems and methods to obtain user input in a manner customized to the capabilities of users.

BACKGROUND

Computing devices may provide computer implemented services. The computer implemented services may be used by users of the computing devices and/or devices operably connected to the computing devices. The computer implemented services may be performed using input from users. For example, users of computing devices may provide input as part of the computer implemented services.

BRIEF DESCRIPTION OF THE DRAWINGS

Embodiments disclosed herein are illustrated by way of example and not limitation in the figures of the accompanying drawings in which like references indicate similar elements.

FIG. 4 shows a block diagram illustrating a data processing system in accordance with an embodiment.

DETAILED DESCRIPTION

Figure 1:
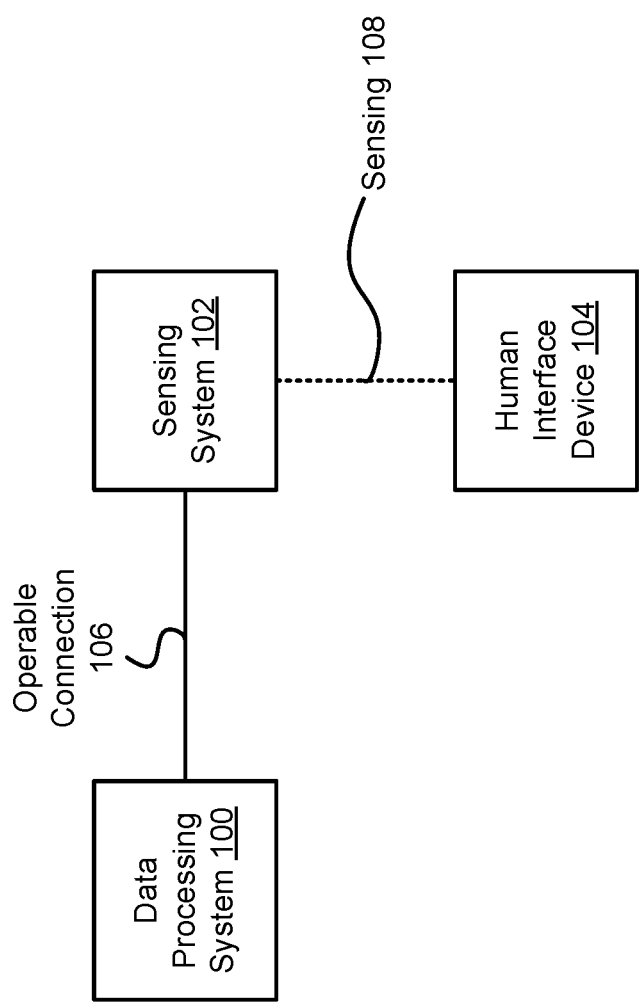
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide the computer implemented services, user input may be obtained. This user input may be provided by a user of a data processing system to activate certain functionalities, change functionalities, terminate functionalities, and/or invoke desired activities by the data processing system.

To obtain the user input, a human interface device may be utilized. Actuation of the human interface device may convey to data processing systems corresponding types of users input. However, not all persons may be capable of actuating human interface devices. For example, persons having limited ranges of motion may be unable to actuate certain types of human interface devices in manners necessary for the data processing systems to obtain user input.

To provide for a broader array of user to provide user input to data processing systems, system in accordance with embodiments disclosed herein may customize the manner in which actuation of human interface devices are interpreted. For example, rather than statically defining how actuations of human interface devices are interpreted, the system may instead allow for associations between various types of actuations of the human interface device and user input to be defined. By doing so, users that may not be able to actuate human interface devices in statically defined manners may still be able to provide user input.

To customize the manner in which actuations of human interface devices are interpreted, a first human interface device may be used. The first human interface device may be unknown (unrecognizable) to the data processing system but may be more easily actuated by various users. The first human interface device may be actuated by the user, and the actuations may be translated into magnetic fields detectable by a sensing system. The sensing system may sense the magnetic fields and obtain information (e.g., a sensor data pattern) reflecting changes in the position and/or orientation of a magnet of the first human interface device that generates the magnetic fields. Thus, information reflecting actuations of the first human interface device by the user may be encoded in the magnetic fields and may be sensed.

However, the obtained information may be uninterpretable by the data processing system due to the first human interface device being unknown to the data processing system. To obtain the user input, the obtained information may be ingested into an inference model. This inference model may be trained to associate the obtained information regarding the actuation of the first human interface device with an actuation of a second human interface device, the second human interface device (and actuations thereof) being known (recognizable) to the data processing system.

Thus, similar to how the actuation of the second human interface device may be mapped to a corresponding operation performable by the data processing system (e.g., a click of a button on a computer mouse to run a software hosted by the data processing system), the data processing system may map the actuation of the first human interface device to the corresponding operation.

By utilizing the inference model, the obtained information regarding changes in the position and/or orientation of the magnet may be translated into user input. The user input may then be used to drive computer implemented services.

By using a magnet, and an inference model to interpret user input from the sensor pattern indicating a position and/or an orientation of the magnet, the first human interface device may not need to be powered, may include fewer components thereby reducing the likelihood of component failures, may be made lighter/smaller thereby reducing loads placed on user of user input devices, etc.

By doing so, a system in accordance with embodiments disclosed herein may have improved portability and usability when compared to other types of devices used to obtain user input that may be powered and/or not customizable to users. Thus, embodiments disclosed herein may address, among others, the technical challenge of loads placed on users during acquisition of user input and physical difficulty in using human interface devices that have statically defined actuations.

In an embodiment, a method for interpreting actuation of a first human interface device unknown to a data processing system is provided.

The method may include obtaining sensor data from a sensing system that tracks a magnetic field emanating from the first human interface device; performing pattern matching of the sensor data against a generalized set of sensor data patterns using an inference model to obtain a type of user input (refer FIG. 21), the type of user input being based on an actuation of a second human interface device that is known to the data processing system, and the actuation of the second human interface device never having been performed; identifying an operation to be performed based on the type of user input; and performing the operation.

The first human interface device is a passive device that may include a magnet; and an attachment element adapted to attach the magnet to a user of the data processing system.

The data processing system may be unable to map any actuation of the first human interface device to any operations performable by the data processing system without use of the inference model.

The sensing system may not be operably connected to the first human interface device, and the sensing system may include a sensing element positioned with a static location while the sensor data is obtained.

The sensing element may be adapted to monitor variations in the magnetic field emanating from the first human interface device over time at the static location and report the sensor data to the sensing system based on the variations, and the variations being due to movement of the first human interface device with respect to the static location.

The sensor data indicates motion of a source of the magnetic field emanating from the first human interface device, the motion being used to identify a position of the first human interface device at a point in time; an acceleration of the first human interface device at the point in time; and a motion path of the first human interface device over a period of time starting at the point in time.

The inference model may be based on training data, the training data being based on an identifier for the type of user input; and a sensor data pattern obtained while the first human interface device is actuated by a user prompted to perform the actuation in a predetermined manner, the sensor data pattern being associated with the identifier in the training data.

The prompt may be presented to the user with a graphical user interface, the graphical user interface displaying a representation of the actuation of the second human interface device; a representation of an actuation of the first human interface device; and a description for interpreting the representation of the actuation of the first human interface device.

In an embodiment, a non-transitory media is provided that may include instructions that when executed by a processor cause the computer-implemented method to be performed.

In an embodiment, a data processing system is provided that may include the non-transitory media and a processor and may perform the computer-implemented method when the computer instructions are executed by the processor.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, user input may be obtained. The user input may indicate, for example, how the computer implemented services are to be provided. The user input may include any type and quantity of information.

To obtain the user input, a user may perform physical actions such as, for example, pressing buttons, moving structures, etc. These physical actions may be sensed by various devices, and the sensing may be interpreted (e.g., translated) to obtain the user input (e.g., data).

However, sensing physical actions by a user may involve use of sensors and/or devices that may consume power. The weight of the devices and forces applied by sources of the consumed power (e.g., batteries, cords to power supplies, etc.) may place a load (e.g., mechanical) on the user attempting to perform the physical actions. The mechanical load may fatigue the user, limit the user, reduce the portability of the devices (e.g., mouses), and/or may be undesirable for other reasons.

Additionally, some of the sensors and/or devices may have form factors that are more difficult for some users to utilize. For example, some of the devices may presume that the users are able to actuate the devices in certain manners. If a user is unable to actuate the devices in these manners, then the user may not be able to (or may do so at reduced level of efficiency) to provide user input or doing so may be challenging for the user.

In general, embodiments disclosed herein may provide methods, systems, and/or devices for obtaining user input and/or using the obtained user input to provide computer implemented services. The user input may be obtained in a manner that is adapted to the capabilities of the user. By adapting the manner in which the user input is obtained to the user, barriers to providing user input may be reduced. For example, persons with limited ranges of motion or other limitations on their ability to manipulate human interface devices may utilize their existing ranges of motion to convey user input to systems. Consequently, barriers to providing user input used to provide computer implemented services may be reduced.

To provide the computer implemented services, a system may include data processing system 100. Data processing system 100 may include hardware components usable to provide the computer implemented services. For example, data processing system 100 may be implemented using a computing device such as a laptop computer, desktop computer, portable computer, and/or other types of computing devices.

Data processing system 100 may host software that may use user input to provide the computer implemented services. For example, the software may provide user input fields and/or other elements through which a user may interact with in order to manage and/or use the computer implemented services provided by data processing system 100.

To facilitate the interaction, data processing system 100 may obtain signals and/or data (e.g., sensor data patterns indicating a position and/or orientation, previously mentioned) from sensing system 102 (e.g., via operable connection 106). Data processing system 100 may interpret (e.g., translate) the signals (e.g., may be analog, and data processing system 100 may include an analog to digital converter) and/or data (e.g., digital data) to obtain the user input.

Sensing system 102 may track (e.g., by sensing 108) and/or provide information (e.g., the signals and/or data) regarding tracking of human interface device 104. Sensing system 102 may also provide the signals and/or data to data processing system 100, as previously mentioned. A user may physically interact with human interface device 104, thereby allowing the signals and/or data provided by sensing system 102 to include information regarding the physical actions of the user.

For example, if a user moves human interface device 104, sensing system 102 may track the change in position, orientation, and/or motion of human interface device 104 and provide signals and/or data reflecting the changes in the position, the orientation, and/or the motion.

To track human interface device 104, sensing system 102 may include one or more sensors that sense a magnetic field emanating from human interface device 104. The sensors may use the sensed magnetic field to track a location (absolute or relative) and orientation (absolute or relative) of a magnet included in human interface device 104. The sensors may generate the signals and/or data provided by sensing system 102 to data processing system 100. The sensors may each sense a magnitude and/or an orientation of the field, relative to a placement of each sensor, as the magnet (emanating the magnetic field) passes proximate to each sensor. By knowing the relative placements of the sensors with respect to one another, the position and/or orientation of the magnet may be identified (e.g., the magnetic field may be treated as emanating from a magnet with known dimensions and/or strength, a field distribution may be presumed, and the sensor readings may be used to identify the location/orientation of the sources of the field distribution).

Sensing system 102 may also include, for example, analog to digital converters, digital signal processing devices or other signal processing devices, and/or other devices for generating the signals and/or data based on information obtained via the sensors.

Human interface device 104 may be implemented with a physical device that a user may actuate in one or more ways. For example, human interface device 104 may (i) be moveable, and/or (ii) may include attachment elements for attaching human interface device 104 to, for example, a portion of the user (e.g., an arm, chest, hip, etc. of the user). Repositioning human interface device 104 may change the orientation and/or the position of the magnet with respect to the sensors of sensing system 102.

For example, when human interface device 104 is moved away from sensing system 102, the strength of the magnetic field emanating from the magnet as sensed by sensors of sensing system 102 may decrease. Similarly, when human interface device 104 is rotated, the magnet may be rotated (e.g., in one or more planes) thereby changing the direction of the magnetic field sensed by sensors of sensing system 102. Refer to FIGS. 2A-2D for additional details regarding sensing of human interface device 104.

Human interface device 104 may be a passive device. For example, human interface device 104 may not consume power, include batteries or sensors, etc. Consequently, human interface device 104 may be of smaller size, lower weight, have higher usability, and/or may provide other advantages when compared to active devices such as a computer mouse. Additionally, it will be appreciated that human interface device 104 may be implemented by one or more physical devices that may be similar to the physical device, mentioned above. Hence, and although described singularly (for simplicity of discussion), human interface device 104 may include one or more magnets, the one or more magnets being attachable to one or more portions of the user. Refer to FIGS. 2A-2E for additional details regarding human interface device 104 and/or actuation of human interface device 104.

Data processing system 100 and/or sensing system 102 may perform pattern matching or other types of operations on sensed field data to identify user input. However, rather than presuming that certain types of changes in field distribution mean certain types of user input, the system of FIG. 1 may perform a process through which a user of human interface device 104 may define the types of changes in field distribution that correspond to certain types of user input. By doing so, the ranges of motion of available to each user may be less likely to limit or impede the ability of the user to use human interface device 104 to convey user input. For example, rather than requiring that a user click a button of a human interface device (which requires a specific range of motion of the user), the system may instead allow a user to define a motion pattern (that gives rise to a unique set of changes in field distribution) that when identified by the system indicates that a corresponding user input has been provided. Thus, the system of FIG. 1 may adapt itself to the capabilities of the user rather than presuming that the user is able to implement particular motion patterns.

To perform pattern matching, the system of FIG. 1 may utilize an inference model that ingests the sensed field distribution changes and infers corresponding user input based on user defined associations between field distribution changes and user input. Once obtained, the user input may be used to drive downstream processes thereby customizing the provided computer implemented services based on the obtained user input.

Figure 3A:
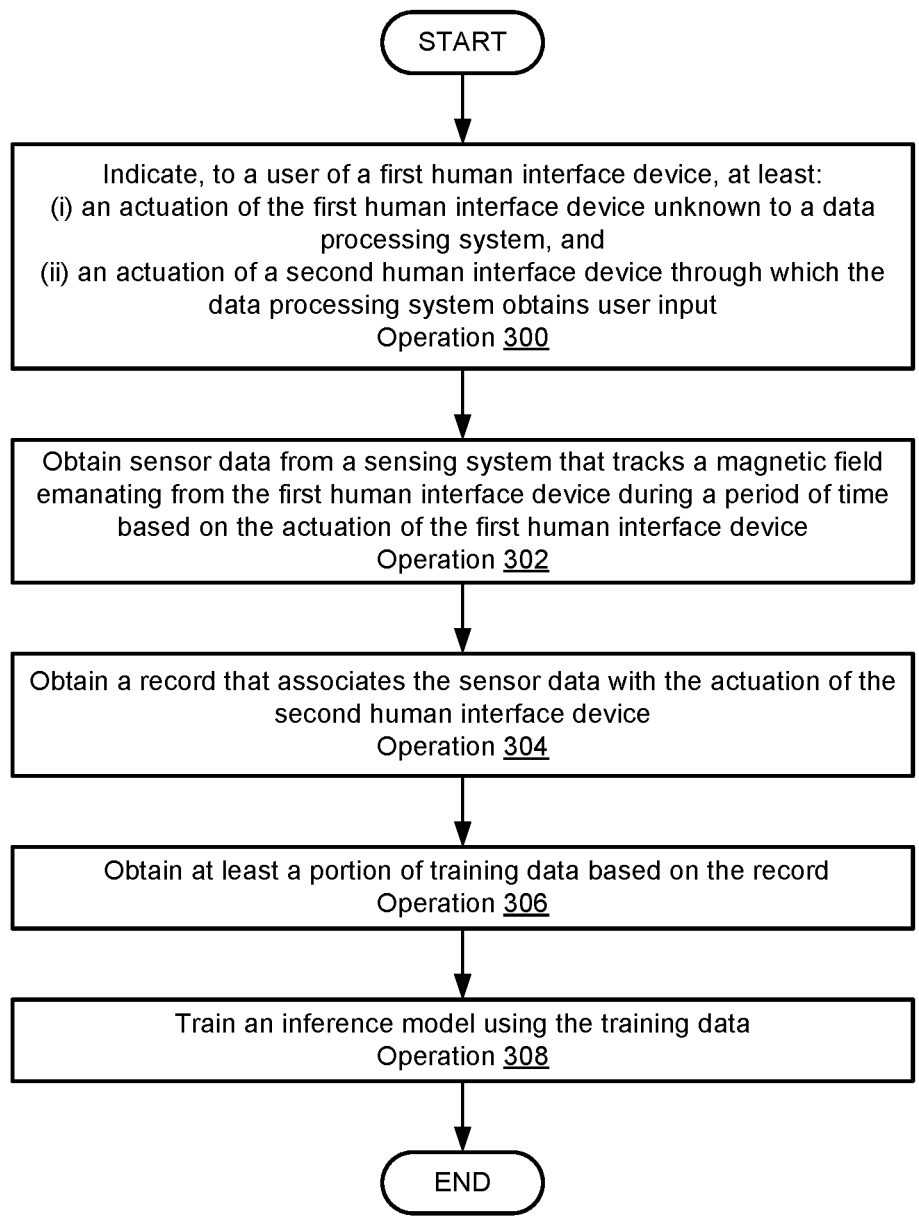
FIG. 3A shows a flow diagram illustrating a method of training an inference model in accordance with an embodiment.
Figure 3B:
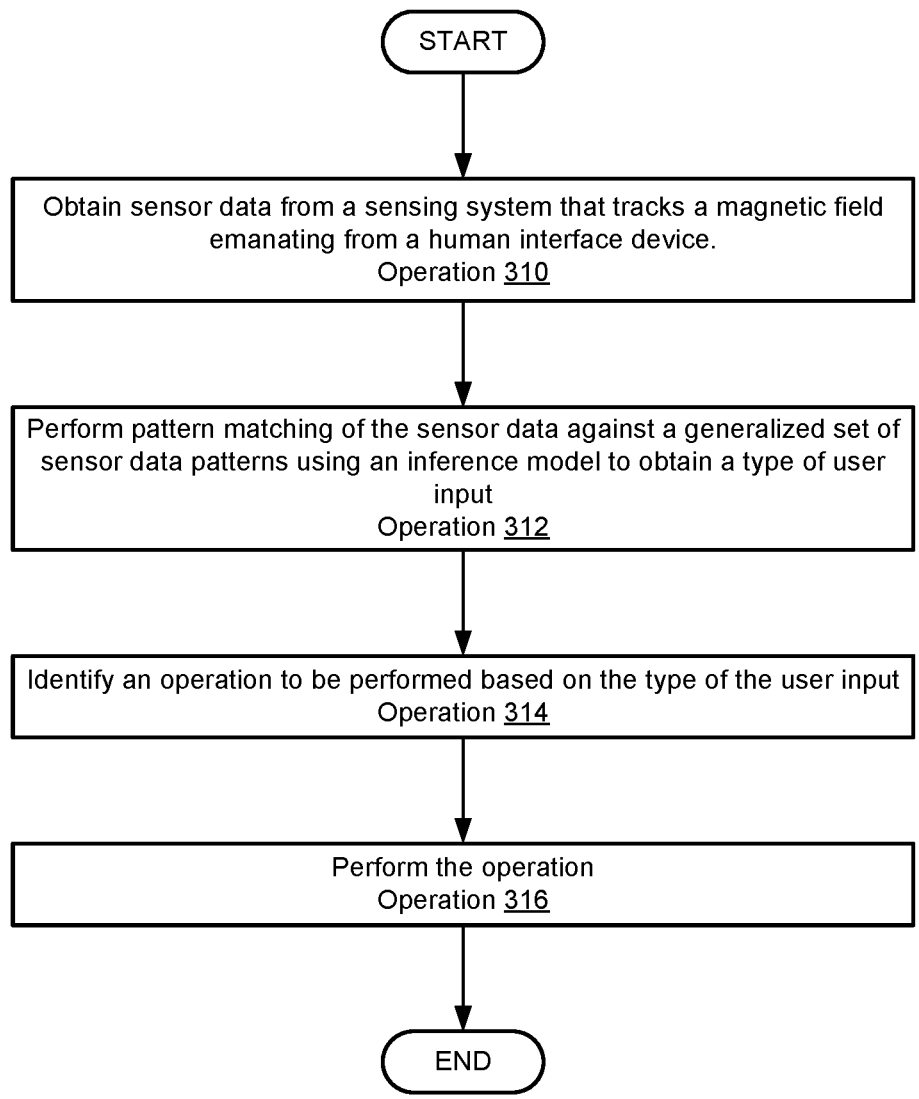
FIG. 3B shows a flow diagram illustrating a method of obtaining user input and providing computer implemented services in accordance with an embodiment.

When providing its functionality, data processing system 100 may perform all, or a portion, of the methods illustrated in FIGS. 3A-3B.

Data processing system 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated). For example, sensing system 102 may be operably connected to data processing system 100 via a wired (e.g., USB) or wireless connection. However, in some embodiment, human interface device 104 may not be operably connected to other device (e.g., may be a passive device), but may be sensed by sensing system 102 via sensing 108. For example, during sensing 108, a static magnetic field emanating from human interface device 104 may be sensed by sensing system 102.

While illustrated in FIG. 1 as included a limited number of specific components, a system in accordance with an embodiment may include fewer, additional, and/or different components than those illustrated therein.

To further clarify embodiments disclosed herein, diagrams illustrating sensing of human interface device 104 in accordance with an embodiment are shown in FIGS. 2A-2D.

Figure 2A:
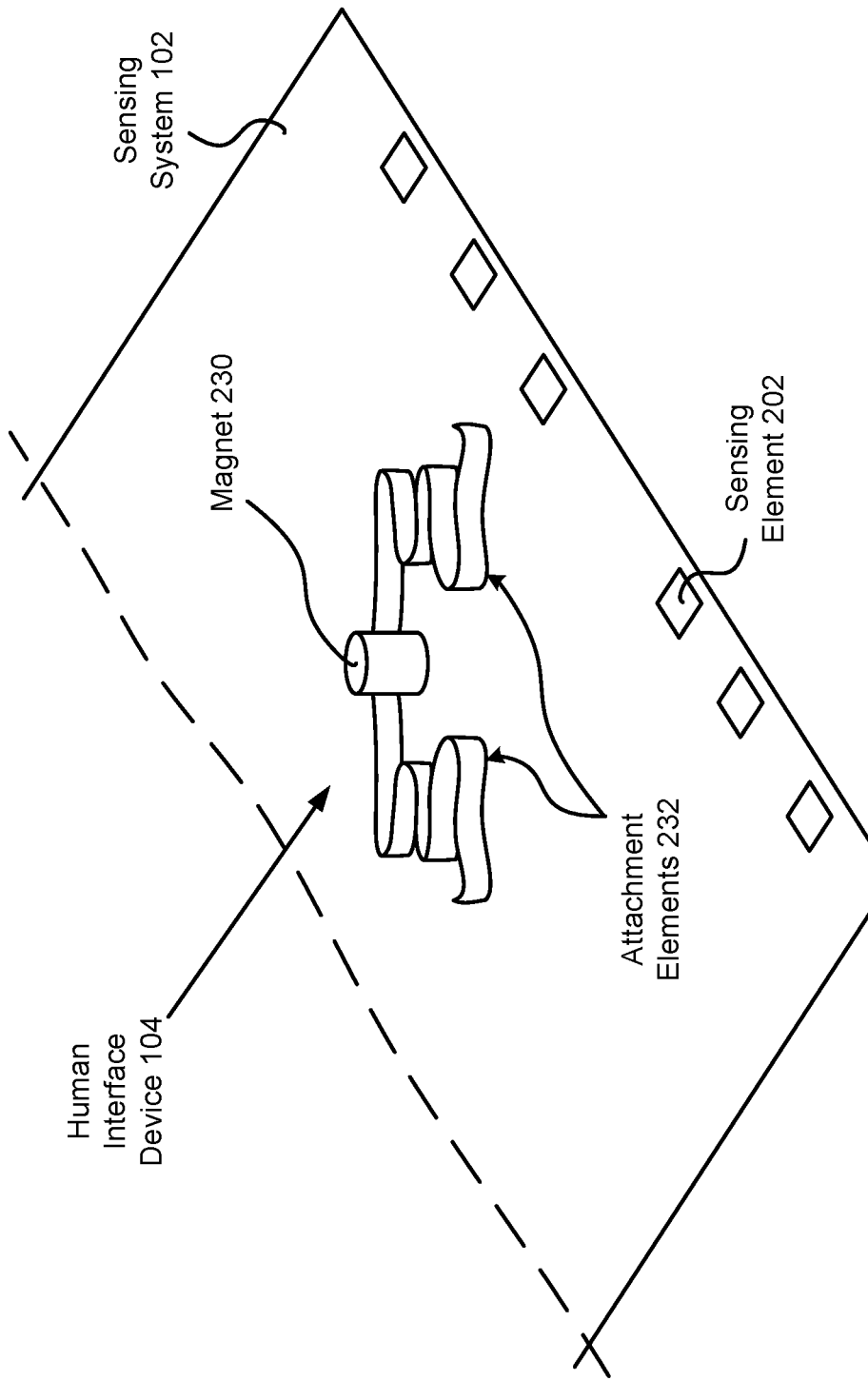
FIG. 2A shows a diagram illustrating a human interface device and a sensing system in accordance with an embodiment.

Turning to FIG. 2A, an isometric diagram of human interface device 104 and sensing system 102 in accordance with an embodiment is shown.

To obtain user input, human interface device 104 may include magnet 230 and attachment elements 232. Magnet 230 is discussed further below with respect to FIGS. 2B-2C. Attachment elements 232 may be implemented with a structure which may securely fasten magnet 230 to a user of the data processing system (e.g., 100). For example, attachment elements 232 may include one or more members (e.g., portions of a strap). The one or more members may extend away from an endpoint to which each of the one or more members is fixed to magnet 230. By extending away from the endpoint, attachment elements 232 may be wrapped around (fastened to) a portion of the user (e.g., an appendage of the user). For example, attachments elements 232 may be implemented using an elastic band, one or more plastic injection molded components or other structures, and/or magnet 230. Magnet 230 may be securely fastened to an appendage or other portion of a user, such as a foot of the user, by wrapping the elastic band around the user's foot and tightening appropriately to secure magnet 230 in place. Refer FIG. 2D for an example implementation of human interface device 104.

Figure 2B:
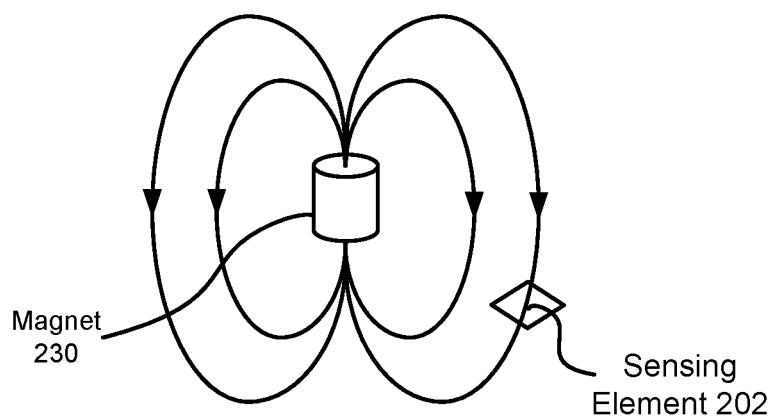
FIGS. 2B-2C show diagrams illustrating field sensing in accordance with an embodiment.
Figure 2C:
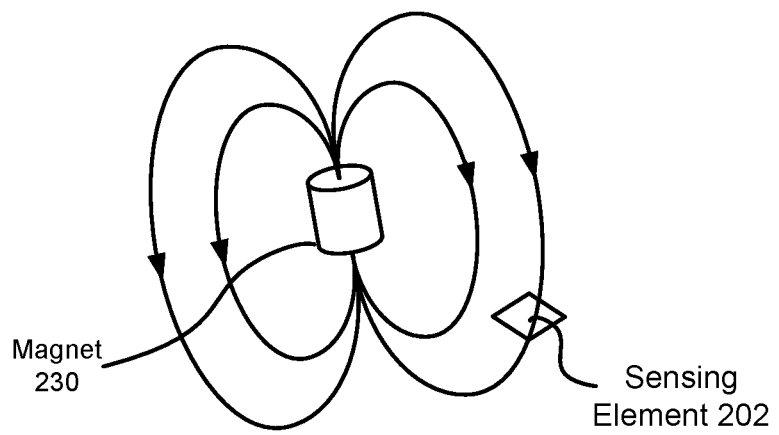

Once attached to a user, the user may actuate human interface device 104 to convey user input to a system and/or define motion paths linked to different types of user input. For example, a person may move and/or rotate the portion(s) of the user that are fastened to magnet 230 (thereby repositioning magnet 230 with respect to sensing elements of sensing system 102, previously mentioned and discussed further below). Moving magnet 230 may change the magnet field sensed by sensing elements (e.g., 202) of sensing system 102. Refer to FIGS. 2B-2C for additional details regarding the magnetic field emanating from human interface device 104.

To obtain user input, sensing system 102 may include any number of sensing elements (e.g., 202). The sensing elements may be implemented using sensors that monitor a magnitude and/or orientation of magnetic fields and generate signals and/or data to reflect changes in the magnitude and/or the orientation. While not shown, sensing system 102 may include a signal processing chain (e.g., any number of signal conditioning and processing devices) that may condition and process the signals generated by the sensing elements to obtain, for example, sensor data patterns that indicate the position and/or orientation of the magnet embedded in human interface device 104.

In FIG. 2A, sensing system 102 is illustrated in the form of a pad or other structure upon which human interface device 104 may be positioned (the dashed line to the top left of the drawing indicates that the structure may continue on beyond that which is explicitly illustrated). However, sensing system 102 may be implemented with other types of structures.

Additionally, while the sensing elements are illustrated with example positions, it will be appreciated that the sensing elements may be positioned differently without departing from embodiments disclosed herein.

Turning to FIGS. 2B-2C, diagrams illustrating a magnet and sensing element 202 in accordance with an embodiment are shown. As noted above, human interface device 104 may include magnet 230. Magnet 230 may project a magnetic field. In these figures, the magnetic field is illustrated using lines with arrows superimposed over the midpoints of the lines. The direction of the arrow indicates and orientation of the field.

As seen in FIG. 2B, when magnet 230 is proximate (e.g., within a predetermined distance range, which may vary depending on the strength of magnet 230 and sensitivity level of sensing element 202) to sensing element 202, the magnetic field may be of sufficient strength to be measurable by sensing element 202. Sensing element 202 may utilize any sensing technology to measure the magnitude and/or the orientation of the magnetic field at its location. Due to the field distribution of magnet 230, the magnitude and orientation of the magnetic field at the location of sensing element 202 may be usable to identify, in part, the location and orientation of magnet 230.

For example, when magnet 230 is rotated as shown in FIG. 2C from the orientation as shown in FIG. 2B, the direction and/or magnitude of the magnetic field at the location of sensing element 202 may change. By identifying the magnitude and orientation of the magnetic field at a number of locations (e.g., corresponding to different sensing elements), the position and orientation of magnet 230 may be identified.

To utilize the location and orientation of the magnet embedded in human interface device 104 to obtain user input, magnet 230 may be mechanically coupled to (fastened to, as previously mentioned) a portion of the user (e.g., an appendage of the user) and thereby, allow repositioning of magnet 230 (with respect to sensing elements of sensing system 102) when the user repositions the portion.

Figure 2D:
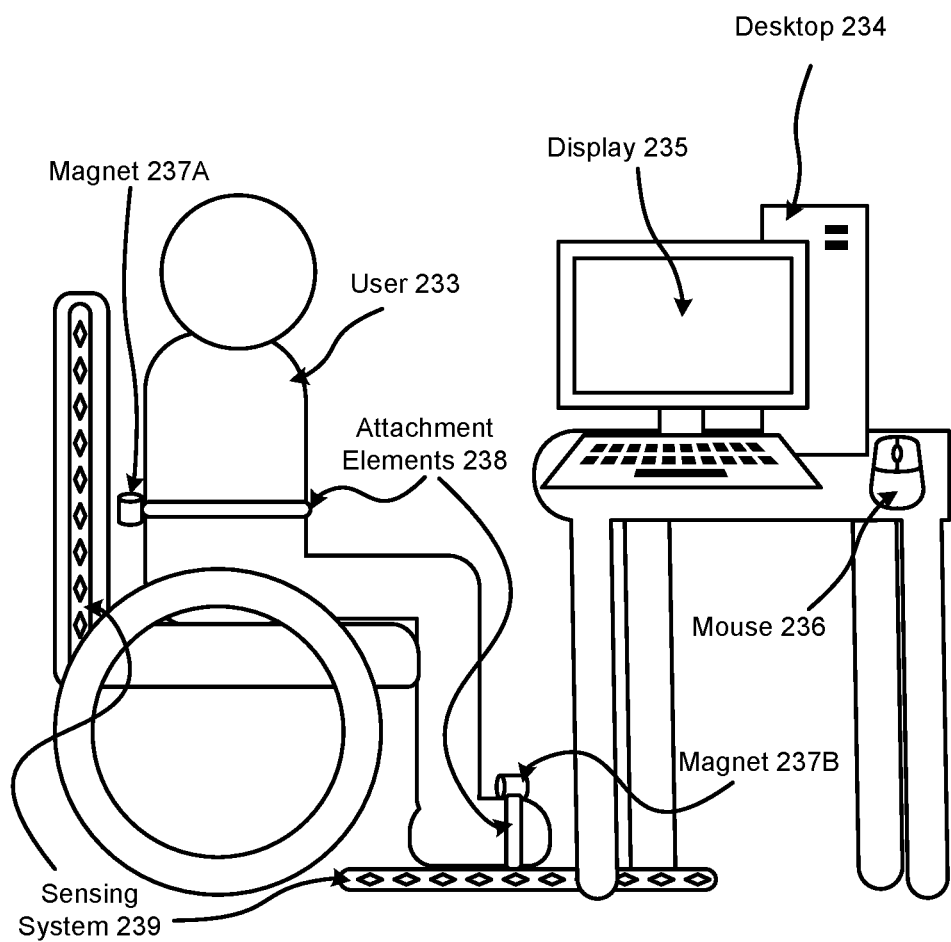
FIG. 2D shows a diagram illustrating an example implementation of a human interface device.

To further clarify embodiments disclosed herein, an example implementation of human interface device 104 in accordance with an embodiment is shown in FIG. 2D. FIGS. 2E-2H show diagrams illustrating representations of actuations of human interface devices (e.g., human interface device 104 and/or other human interface devices) over time in accordance with an embodiment. FIG. 2I shows a data flow diagram showing collection of training data in accordance with an embodiment.

As discussed above, to adapt itself to the range of motion and/or other characteristics of user, one or more human interface device may be attached to a user. Turning to FIG. 2D, a diagram of human interface devices attached to a user in accordance with an embodiment is shown. The diagram may depict a view of user 233. User 233 may be unable (e.g., due to a disability) to utilize computer peripheral devices such as a computer mouse, keyboard, etc. through which user input may be provided to desktop 234 (e.g., a data processing system).

Desktop 234 may be operably connected to peripheral devices such as display 235 and mouse 236. Display 235 may be adapted to display a graphical user interface (GUI) that a user of the data processing system may interact with in order to receive computer implemented services (e.g., a personalization setup process, discussed further below and with regard to FIGS. 2E-2I) from the data processing system. Mouse 236 may be a known human interface device of the data processing system, and actuations thereof being mappable to operations performable by the data processing system in order to, for example, interact with the GUI.

As previously mentioned, user 233 may be unable to utilize the commonly used computer peripherals (e.g., a computer mouse). Thus, user 233 may be unable to use mouse 236 (at least, for example, without an undesired level of difficulty) to provide user input to the GUI displayed on display 235.

However, using an inference model (discussed further below) and a human interface device that includes at least one magnet (e.g., human interface device 104), user 233 may be able to have personalized actuations be accurately identified as user input by the data processing system. To do so, the human interface device may include, for example, magnet(s) 237A-237B and attachment elements 238. Attachment elements 238 may be used to fasten magnet(s) 237A-237B to portions of user 233 in which user 233 has sufficient mobility and control. For example, these portions may include a torso and the foot of user 233. The magnets may be fastened to user 233 as illustrated.

The magnets of the human interface device may be sensed by sensing system 239 (e.g., may be similar to sensing system 102). Sensing system 239 may be positioned within a range of the magnets. For example, a first portion of sensing system 239 may be embedded in the wheelchair of user 233 to be within a range of magnet 237A, and a second portion may be below the foot of user 233 to be within range of magnet 237B. Various portions of sensing system 239 usable to sense human interface devices may be positioned elsewhere without departing from embodiments disclosed herein.

As discussed with regard to FIGS. 2A-2C, user 233 may actuate magnet(s) 237A-237B in order to convey user input. The actuation may be sensed by sensing system 239 based on changes in the magnetic fields of the magnets to obtain information about positions and/or orientations of the magnets with respect to sensors of sensing system 239.

To identify user input based on actuation of the magnets, an inference model may be trained (discussed with respect to FIGS. 2I-3A) to associate the obtained information regarding the actuation of the human interface device (e.g., human interface device 104) with an actuation of, for example, mouse 236 (e.g., the second human interface device). In other words, the inference model may map changes in sensed magnetic fields to user input provided by types of human interface devices that are commonly used.

To do so, a personalization setup process may be performed. During the personalized setup process, user 233 may establish associations between (i) changes in sensed magnetic field due to actuations of the magnets and (ii) user input provided by types of human interface devices that are commonly used. For example, user 233 may associate sensed magnetic field changes over time while a magnet is actuated in a manner that is comfortable for a user to a type of user input (e.g., a right click) by a mouse. Any number of such associations may be established by the user.

The inference model, once trained, may then map new changes in sensed magnetic field distributions over time to user input. The user input may then be used to drive computer implemented services.

To customize the inference model to provide the aforementioned mappings, labeled training data may be obtained. Generally, the labeled training data may be obtained by (i) indicating, to the user, a type of user input, (ii) indicating, to the user, a type of motion pattern to perform, (iii) collecting sensed magnetic field data while the user attempts to perform the motion pattern, and (iv) establishing an association between the user input and the sensed magnetic field data. The aforementioned process may be repeated any number of times to obtain a corpus of training data.

To convey information to the user, a graphical user interface may be utilized. FIGS. 2E-2H show diagrams illustrating examples of GUIS and collected sensed magnetic field data in accordance with an embodiment.

Figure 2E:
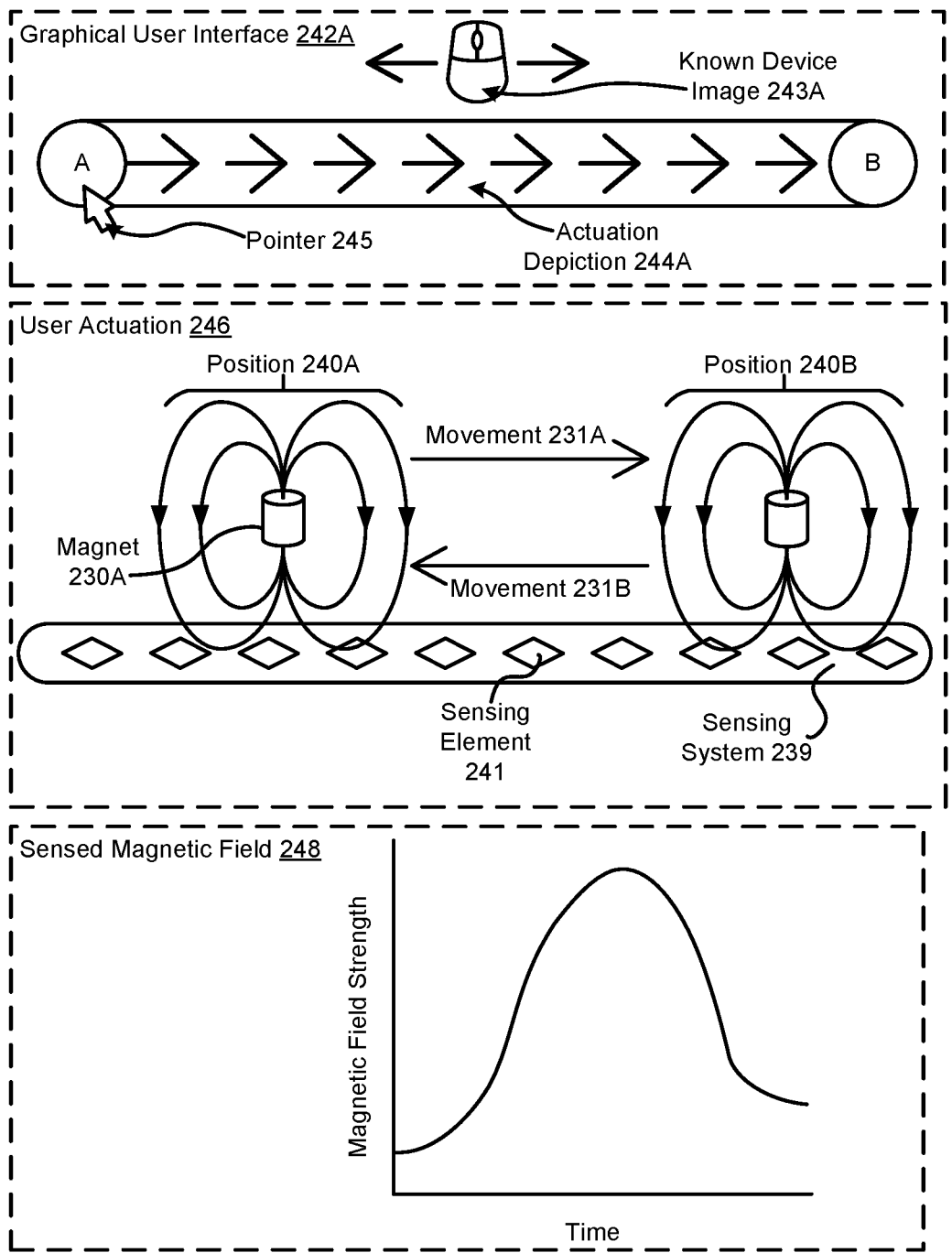
FIG. 2E shows a diagram illustrating representations of actuations of human interface devices over time in accordance with an embodiment.

Turning to FIG. 2E, a diagram illustrating a portion of a customization process in accordance with an embodiment are shown. During the customization process, the user may define an association between a user input and sensed magnetic field data.

To define the association, GUI 242A may be presented to a user that conveys (i) a user input commonly utilized, and (ii) a motion pattern. To convey the user input to a user viewing GUI 242A, GUI 242A may include known device image 243A. Known device image 243A may be a representation of a commonly used peripheral device such as a mouse, keyboard, etc. The graphical representation may also include graphical elements such as arrows or other indicators that convey a type of actuation of the peripheral device. Thus, a user that is aware of the type of the peripheral device and the type of actuation conveyed by the representation may understand the type of user input that is going to be defined. For example, if the representation of peripheral device is a mouse and arrows are depicted on side of the mouse, then the user may understand the type of user input that is going to be defined is that which is obtained when the mouse undergoes side-to-side motion.

To convey the motion pattern to the user viewing GUID 242, GUI 242A may include actuation depiction 244A. Actuation depiction 244A may include an animation or static graphic depicting a first path (from point A to point B). The path may indicate that user 233 is to manipulate a human interface device along a similar path (as indicated by the black arrows) as shown in the graphic.

The graphic may also include a visual representation of how an actuation is to be performed by user 233. For example, the graphic may indicate that a first actuation may be performed by a first series of motions to move pointer 245 from point A to point B, point B being to the right of point A, and back to point A, and so on until a sufficient number of sensor data patterns (discussed further below) is obtained by sensing system 239.

By following the instructions provided by the application and depicted in a set of graphical displays (e.g., GUI(s) 242A-242D), user 233 may provide sensing system 239 with first information regarding a first actuation of the unknown human interface device and/or the sensing data. The first actuation of the known human interface device (e.g., as depicted in known device image 243A) may be mapped to the sensing data using the inference model (discussed further with respect to FIGS. 2I-3A).

When the user follows the instructions prompted by GUI 242A, the user may apply actuations to a magnet of the human interface device as depicted in actuation depiction 244A. For example, the user may move magnet 230A (fastened to the torso of user 233) across the first portion of sensing system 239 in a left, then right, then left motion as user 233 manipulates the torso to sway left, then right, then left, etc. Sensing element 241 of sensing system 239 may sense a magnetic field (as illustrated by user actuation 246) emanating from magnet 230A as magnet 230A is moved between in this motion pattern (e.g., via movement 231A-

231B, from position 240A to position 240B). Changes in the magnetic field sensed by sensing element 241 may be sensed to establish mappings between sensed data and corresponding actuations of the known device.

For example, as shown in graph 248, when sensing element 241 senses the local magnetic field over time, the magnitude of the sensed field may increase and decrease over time (or may change in different ways, depending on how the user moves a human interface device). The actuation depictions (e.g., 244A) used to prompt a user may be designed to create distinguishable patterns of changes in magnetic field strength such that the user may provide a variety of types of user input.

Figure 2F:
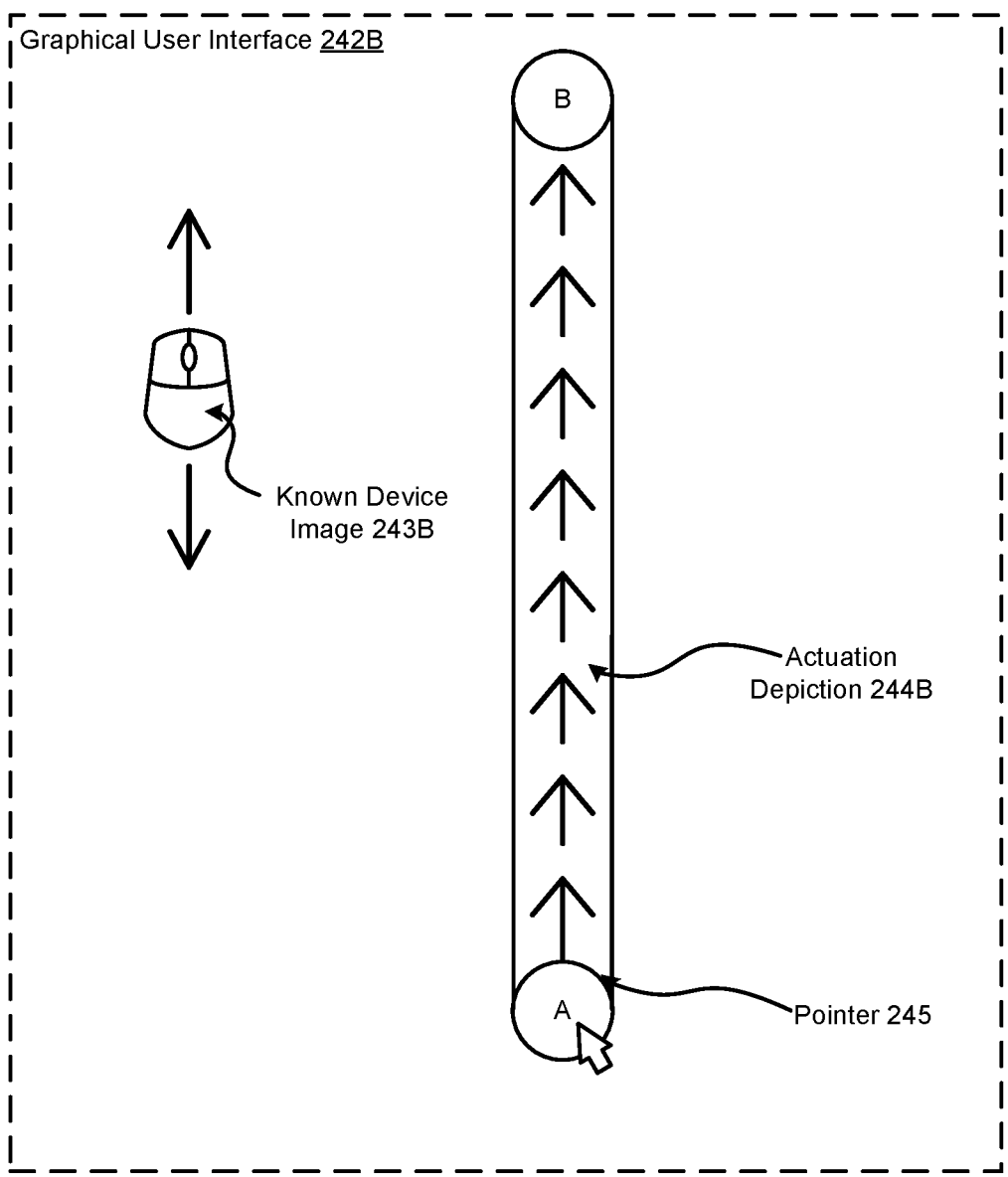
FIGS. 2F-2H show diagrams illustrating representations of actuations of a human interface device over time in accordance with an embodiment.

Turning to FIG. 2F, a diagram illustrating a second portion of the customization process in accordance with an embodiment are shown. During the second portion of the customization process, the user may define another association between a user input and sensed magnetic field data.

To define the association, GUI 242B may be presented to a user that conveys (i) a second user input commonly utilized, and (ii) a second motion pattern. To convey the user input to a user viewing GUI 242B, GUI 242B may include known device image 243B. known device image 243B may be a representation of the same commonly used peripheral device. The graphical representation may also include graphical elements such as arrows or other indicators that convey a type of actuation of the peripheral device. In this example, arrows may extend above and below the graphical representation. Thus, a user that is aware of the type of the peripheral device and the type of the actuation conveyed by the representation may understand the type of user input that is going to be defined. For example, if the representation of peripheral device is a mouse and arrows are depicted on a top and bottom of the mouse, then the user may understand the type of user input that is going to be defined is that which is obtained when the mouse undergoes top-to-bottom motion.

To convey the motion pattern to the user viewing GUI 242B, GUI 242B may include actuation depiction 244B. Actuation depiction 244B, like the actuation depiction described with respect to FIG. 2E, may include an animation or static graphic depicting a second path (from point A to point B). The path may indicate that user 233 is to manipulate a human interface device along a similar path (as indicated by the black arrows) as shown in the graphic.

When the user follows the instructions prompted by GUI 242B, the user may apply actuations to a magnet of the human interface device as depicted in actuation depiction 244B. For example, the user may move magnet 230A (fastened to the torso of user 233) across a second portion of sensing system 239 in a forward, then back, then forward motion as user 233 manipulates the torso to sway forward and back, etc. Sensing element 241 of sensing system 239 may sense a magnetic field emanating from magnet 230A as magnet 230A is moved between in this motion pattern. Changes in the magnetic field sensed by sensing element 241 may be sensed to establish mappings between sensed data and corresponding actuations of the known device.

Figure 2G:
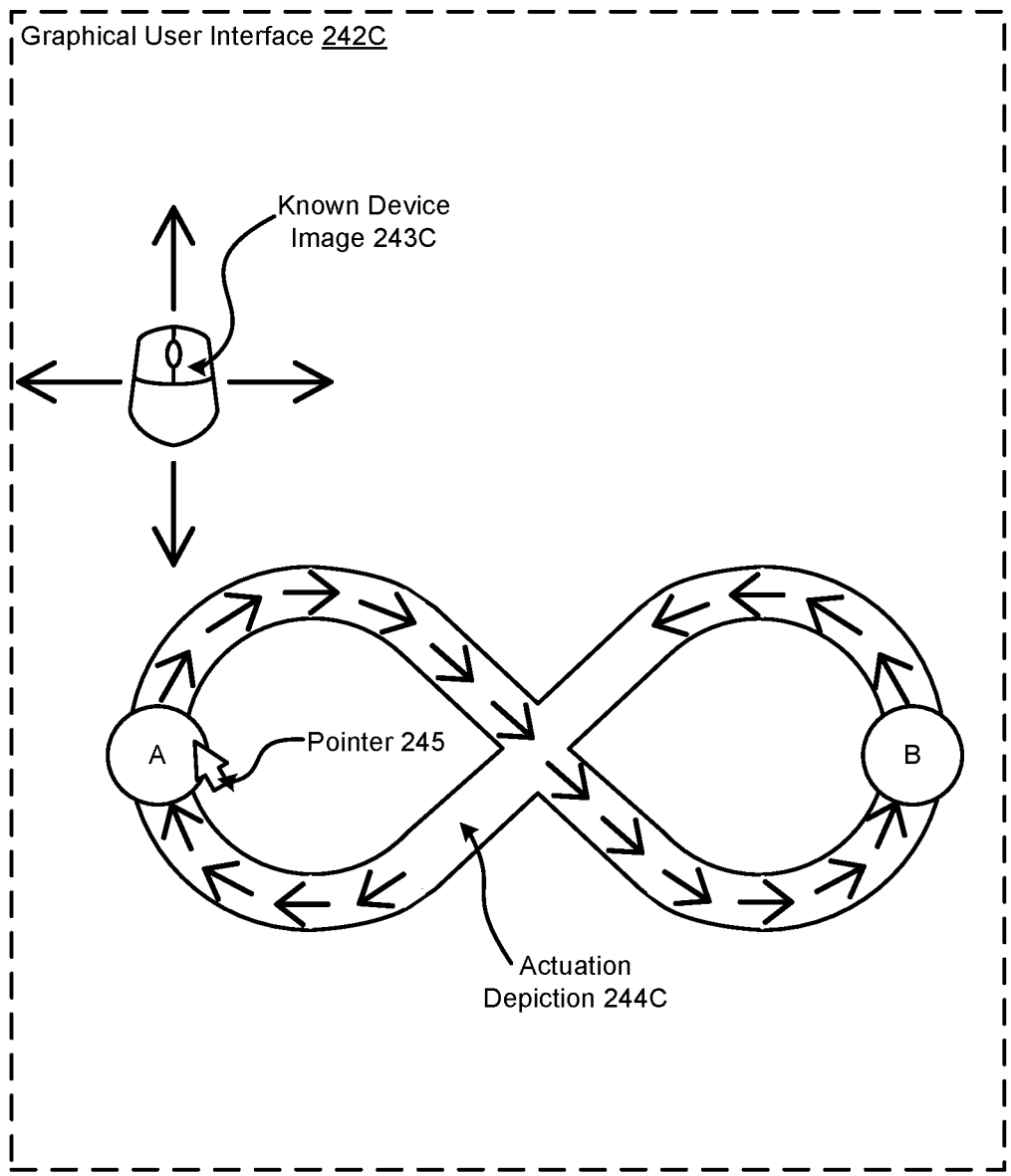

Turning to FIG. 2G, a diagram illustrating a third portion of the customization process in accordance with an embodiment are shown. During the third portion of the customization process, the user may define a third association between a user input and sensed magnetic field data.

To define the association, GUI 242C may be presented to a user that conveys (i) a third user input commonly utilized, and (ii) a third motion pattern. To convey the user input to a user viewing GUI 242C, GUI 242C may include known device image 243C. Known device image 243C may be a representation of the same commonly used peripheral device. The graphical representation may also include graphical elements such as arrows or other indicators that convey a type of actuation of the peripheral device. In this example, arrows may extend on four sides of the graphical representation. Thus, a user that is aware of the type of the peripheral device and the type of the actuation conveyed by the representation may understand the type of user input that is going to be defined. For example, if the representation of peripheral device is a mouse and arrows are depicted on four sides of the mouse, then the user may understand the type of user input that is going to be defined is that which is obtained when the mouse undergoes a combination of side-to-side motion and top-to-bottom motion.

To convey the motion pattern to the user viewing GUI 242C, GUI 242C may include actuation depiction 244C. Actuation depiction 244C, like the actuation depiction described with respect to FIGS. 2E-2F, may include an animation and/or static graphic depicting a third path (from point A to point B) that follows a figure eight shape. The path may indicate that user 233 is to manipulate a human interface device along a similar path (as indicated by the black arrows) as shown in the graphic.

When the user follows the instructions prompted by GUI 242C, the user may apply actuations to a magnet of the human interface device as depicted in actuation depiction 244C. For example, the user may move magnet 230A (fastened to the torso of user 233) across both the first portion and the second portion of sensing system 239 in a figure eight motion as user 233 manipulates the torso to sway forward and back while also swaying from side to side, etc. Sensing element 241 of sensing system 239 may sense a magnetic field emanating from magnet 230A as magnet 230A is moved between in this motion pattern. Changes in the magnetic field sensed by sensing element 241 may be sensed to establish mappings between sensed data and corresponding actuations of the known device.

While described with respect to movement of a single magnet, it will be appreciated that a user may move a combination of different magnets that are separately sensed to establish associations for user input. For example, rather than using a single magnet, user 233 may use both magnets 237A and 237B. To do so, the user may sway backward and forward while also rocking their foot (to which magnet 237B is attached) back and forth. By doing so, the movement of the respective magnets may be associated with different dimensions of the movement (e.g., the first magnet may be associated with up/down movement of actuation depiction 244, and the second magnet may be associated with side-to-side movement of actuation depiction 244). Accordingly, a user that may not be able to move their torso or foot in two dimensions may provide for two-dimensional control of a pointing device by encoding changes in the location of the mouse cursor in movements of the respective magnets.

Figure 2H:
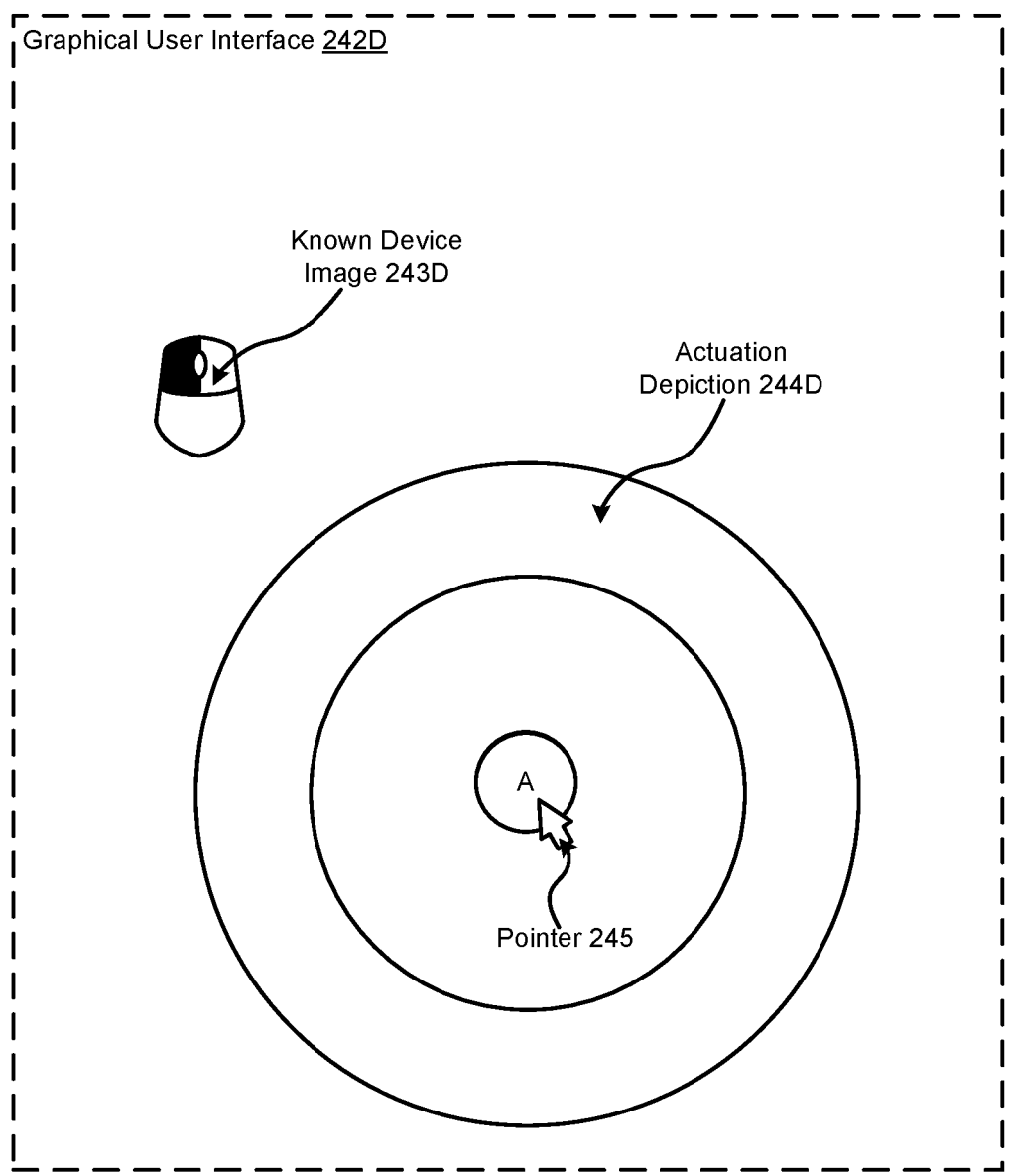
Figure 2I:
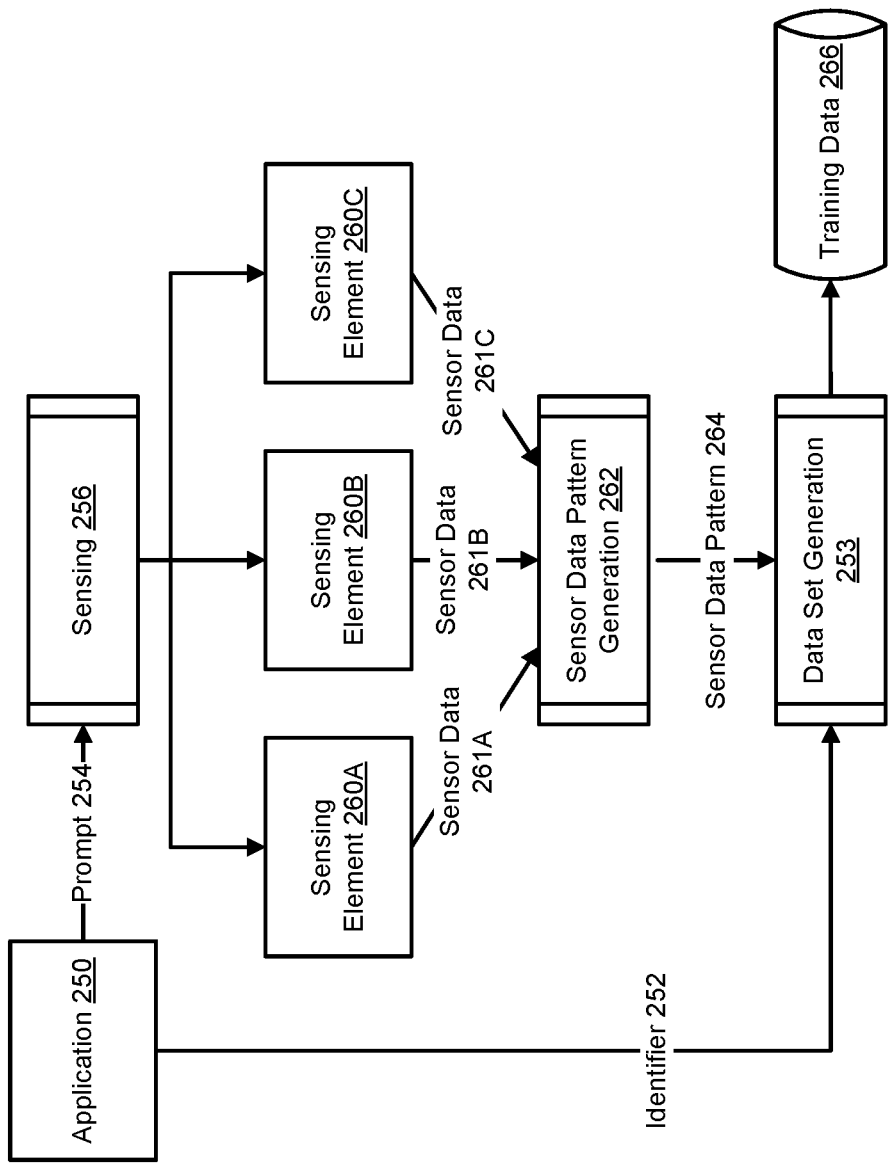
FIG. 2I shows a data flow diagram illustrating training data generation in accordance with an embodiment.

Turning to FIG. 2H, a diagram illustrating a fourth portion of the customization process in accordance with an embodiment are shown. During the fourth portion of the customization process, the user may define a fourth association between a user input and sensed magnetic field data.

To define the association, GUI 242D may be presented to a user that conveys (i) a fourth user input commonly utilized, and (ii) a fourth motion pattern. To convey the user input to a user viewing GUI 242D, GUI 242D may include known device image 243D. Known device image 243D may be a representation of the same commonly used peripheral device. The graphical representation may also include graphical elements such as infill patterns that convey a type of actuation of the peripheral device. In this example, a black infill covering a portion of the representation corresponding to a mouse button is present. Thus, a user that is aware of the type of the peripheral device and the type of the actuation (i.e., clicking a button) conveyed by the representation may understand the type of user input that is going to be defined. For example, if the representation of the peripheral device is a mouse and a button is drawn with infill, then the user may understand the type of user input that is going to be defined is that which is obtained when the button drawn with infill is actuated.

To convey the motion pattern to the user viewing GUI 242D, GUI 242D may include actuation depiction 244D. Actuation depiction 244D, like the actuation depiction described with respect to FIGS. 2E-2G, may include an animation and/or static graphic depicting that a pointer be held in place for a predetermined amount of time. For example, a circle around a location (e.g., labeled as "A" in FIG. 2H) may be presented to the user.

When the user follows the instructions (i.e., not providing input indicating movement of a pointer) prompted by GUI 242D, the user may apply actuations to a magnet of the human interface device as depicted in actuation depiction 244D. For example, the user may hold magnet 230A (fastened to the torso of user 233) in place. Sensing element 241 of sensing system 239 may sense a magnetic field emanating from magnet 230A as magnet 230A is held in place. Changes (or in this case, lack of such changes) in the magnetic field sensed by sensing element 241 may be sensed to establish mappings between sensed data and corresponding actuations of the known device.

Once associations are obtained as described with respect to FIGS. 2E-2H, the associations may be used to obtain an inference model. Turning to FIG. 2I, a data flow diagram illustrating a process to obtain training data 266 in accordance with an embodiment is shown. Training data 266 may associate sensed field distributions over time with user input.

To obtain training data 266, any of the processes described with respect to FIGS. 2E-2H may be performed. During the performance of these processes, information regarding types of user input for which the system may be trained may be conveyed to the user and the user may actuate human interface devices positioned with the user to generate the changing (or unchanging) field distributions over time to facilitate training.

For example, when a user is prompted (e.g., 254) using a GUI, a corresponding identifier (e.g., 252) may be obtained based on the type of the user input conveyed to the user. The identifier may be provided by an application (e.g., 250) or other entity of a data processing system that may manage operation of the display on which the GUI is displayed to the user.

Sensing 256 may be performed during a period of time when the user is expected to move responsively to the prompt. During sensing 256, sensor data (e.g., 261A-261C) from any number of sensing elements (e.g., 260A-260C) may be obtained. The sensor data may be ingested by sensor data pattern generation 262 to generate sensor data pattern 264. Sensor data pattern 264 may be a data structure that reflects the time changing field distribution which a user generates when prompted with respect to a type of user input.

Identifier 252 and sensor data pattern 264 may be ingested by data set generation 253 to obtain training data 266. Data set generation 253 may establish an association between identifier 252 and sensor data pattern 264 and may add the association to training data 266. The aforementioned process may be repeated any number of times to add any number of associations to training data 266 (e.g., thereby establishing feature-label relationships in training data 266 usable to perform supervised learning).

As discussed above, the components of FIGS. 1-2C may perform various methods to provide user input in a manner that reduces the burden on users to provide the user input. FIGS. 3A-3B illustrate methods that may be performed by the components of FIGS. 1-2C. In the diagrams discussed below and shown in these figures, any of the operations may be repeated, performed in different orders, omitted, and/or performed in parallel with or a partially overlapping in time manner with other operations.

Turning to FIG. 3A, a flow diagram illustrating a method of training an inference model in accordance with an embodiment is shown. The method may be performed by data processing system 100, sensing system 102, human interface device 104, and/or other components of the system of FIG. 1.

At operation 300, an actuation of a first human interface device (unknown to a data processing system) and an actuation of a second human interface device (known to the data processing system) through which the data processing system obtains user input regularly, are indicated to the user. These actuations may be indicated to the user by utilizing a GUI to convey the actuations (e.g., as discussed with respect to FIG. 2I) to the user. For example, the user may be provided information using the GUI. The information may prompt the user to perform the actuation of the first human interface device.

At operation 302, sensor data is obtained from a sensing system that tracks a magnetic field emanating from the first human interface device during a period of time based on the actuation of the first human interface device. The sensor data may be obtained by sensing properties, such as an orientation, position, and/or acceleration, of a magnet of the first human interface device with respect to the sensing system.

These properties may be sensed by (i) obtaining measurements of a magnetic field emanating from the magnet, and (ii) computing the position, orientation, and/or acceleration of the magnet based on the measurements. For example, when performing the actuation of the first human interface device, the magnet positioned with the user may be used to generate a change (or unchanging) of field distributions over time. This change may then be sensed by the sensing system to obtain sensor data reflective of the generated change (or unchanging).

It will be appreciated that the first human interface device may be actuated any number of times, in any number of ways, and/or for any duration of time. This duration, number (frequency), and/or a speed of the actuation (determined by the duration of time).

At operation 304, a record is obtained that associates the sensor data with the actuation of the second human interface device. The record may be obtained by (i) linking the identifier of the actuation of the second human interface device with the sensor data to obtain a record, and (ii) storing the record with other records. The identifier may include any type of information usable to identify the type of the user input associated with the actuation of the second human interface device.

At operation 306, at least a portion of training data is obtained based on the record. The training data may be obtained by adding the record to a training data set that may be used as training data.

It will be appreciated that operations 300-306 may be repeated any number of times to add any number of records to the training data set.

At operation 308, an inference model is trained using the training data. The inference model may be obtained by, for example, setting weights using the training data. The weights may be set by (i) setting the weights to initial values, (ii) calculating how well the inference model predicts the labels in the training data for the corresponding sensor data, and (iii) selecting new weights based on how well the inference model predicts the labels. In other words, performing a training cycle. Any number of training cycles may be performed until a criteria is met. The criteria may specify when the training is complete. The criteria may be, for example, a degree of how well the inference model predicts the labels, completion of a predetermined number of training cycles, or other criterial.

While described with respect to training of a neural network, it will be appreciated that other types of predictive models may be used. For example, decision trees, regression models, or other types of predictive models may be used.

The method may end following operation 308.

Thus, using the method illustrated in FIG. 3A, embodiments disclosed herein may provide for generation of inference models usable to obtain user input customized to the type of movement patterns that users are able to comfortably carry out. Consequently, a variety of users that may perform different movement patterns may provide user input to a system.

Turning to FIG. 3B, a flow diagram illustrating a method of obtaining user input and providing computer implemented services in accordance with an embodiment is shown. The method may be performed by data processing system 100, sensing system 102, human interface device 104, and/or other components of the system of FIG. 1.

At operation 310, sensor data is obtained from a sensing system that tracks a magnetic field emanating from a human interface device. The sensor data may be obtained as described with regard to operation 302 of FIG. 3A.

At operation 312, pattern matching of the sensor data against a generalized set of sensor data patterns is performed using an inference model to obtain a type of user input. The pattern matching may be performed by ingesting the sensor data into an inference model. The inference model may output the type of the user input responsive to the ingested sensor data.

The inference model may generalize previously obtained sensor data pattern (e.g., by being trained using a number of different sensor data patterns for each type of user input).

At operation 314, an operation to be performed is identified based on the type of user input. The operation may be identified by providing the user input to an application or other entity that consumes the type of the user input. For example, the application may use the type of the user input to identify a function to be performed.

The operation may also be identified by, for example, using the position of the human interface device to identify a change in focus of the user (e.g., a cursor location on a display). The combination of the focus of the user and the user input (e.g., based on the user clicking an actuatable portion of a human interface device) may then be used to identify, for example, a function of the application or other type of functionality to be initiated or otherwise performed.

At operation 316, the operation is performed. The operation may be performed by, for example, initiating performed by an operating system application, or other type of consumer of the user input. The consumer may then take action (e.g., provide computer-implemented services) based on the operation.

For example, the type of the user input may be one of multiple types conveyed using the human input device. When received, the focus of the system in combination with the user input may indicate the operation to be performed. The operation may then be performed by the system.

The method may end following operation 316.

Thus, using the method illustrated in FIG. 3B, embodiments disclosed herein may use an inference model to interpret actuations of a human interface device by a user of a data processing system to obtain user input. The actuations may be interpreted to indicate types of user input that the system knows how to interpret and utilize in its operation. Consequently, users that may have limitations regarding certain types of actuations may still provide user input using other type of actuations which the users may carry out.

Any of the components illustrated in FIGS. 1-21 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OV®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/ logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A data processing system, comprising:
   a processor; and
   a memory coupled to the processor to store instructions, which when executed by the processor, cause the processor to perform operations for interpreting actuation of a first human interface device unknown to a data processing system, the operations comprising:
      obtaining sensor data from a sensing system that tracks a magnetic field emanating from the first human interface device;
      performing pattern matching of the sensor data against a generalized set of sensor data patterns using an inference model to obtain a type of user input, the type of user input being based on an actuation of a second human interface device that is known to the data processing system, and the actuation of the second human interface device never having been performed;
      identifying an operation to be performed based on the type of the user input; and
      performing the operation.

2. The data processing system of claim 1, wherein the first human interface device is a passive device comprising:
   a magnet; and
   an attachment element adapted to attach the magnet to a user of the data processing system.

3. The data processing system of claim 1, wherein the data processing system is unable to map any actuation of the first human interface device to any operations performable by the data processing system without use of the inference model.

4. The data processing system of claim 1, wherein the inference model is based on training data, the training data being based on:
   an identifier for the type of the user input; and
   a sensor data pattern obtained while the first human interface device is actuated by a user prompted to perform the actuation in a predetermined manner, the sensor data pattern being associated with the identifier in the training data.

5. A non-transitory machine-readable medium having instructions stored therein, which when executed by a processor, cause the processor to perform operations for interpreting actuation of a first human interface device unknown to a data processing system, the operations comprising:
   obtaining sensor data from a sensing system that tracks a magnetic field emanating from the first human interface device;
   performing pattern matching of the sensor data against a generalized set of sensor data patterns using an inference model to obtain a type of user input, the type of user input being based on an actuation of a second human interface device that is known to the data processing system, and the actuation of the second human interface device never having been performed;
   identifying an operation to be performed based on the type of the user input; and
   performing the operation.

6. The non-transitory machine-readable medium of claim 5, wherein the first human interface device is a passive device comprising:
   a magnet; and
   an attachment element adapted to attach the magnet to a user of the data processing system.

7. The non-transitory machine-readable medium of claim 5, wherein the data processing system is unable to map any actuation of the first human interface device to any operations performable by the data processing system without use of the inference model.

8. The non-transitory machine-readable medium of claim 5, wherein the sensing system is not operably connected to the first human interface device, and the sensing system comprises a sensing element positioned with a static location while the sensor data is obtained.

9. The non-transitory machine-readable medium of claim 8, wherein the sensing element is adapted to monitor variations in the magnetic field emanating from the first human interface device over time at the static location and report the sensor data to the sensing system based on the variations, and the variations being due to movement of the first human interface device with respect to the static location.

10. The non-transitory machine-readable medium of claim 9, wherein the sensor data indicates motion of a source of the magnetic field emanating from the first human interface device, the motion being used to identify:
  a position of the first human interface device at a point in time;
  an acceleration of the first human interface device at the point in time; and
  a motion path of the first human interface device over a period of time starting at the point in time.

11. The non-transitory machine-readable medium of claim 5, wherein the inference model is based on training data, the training data being based on:
  an identifier for the type of the user input; and
  a sensor data pattern obtained while the first human interface device is actuated by a user prompted to perform the actuation in a predetermined manner, the sensor data pattern being associated with the identifier in the training data.

12. The non-transitory machine-readable medium of claim 11, wherein the prompt is presented to the user with a graphical user interface, the graphical user interface displaying:
  a representation of the actuation of the second human interface device;
  a representation of an actuation of the first human interface device; and
  a description for interpreting the representation of the actuation of the first human interface device.

13. A method for interpreting actuation of a first human interface device unknown to a data processing system, the method comprising:
  obtaining sensor data from a sensing system that tracks a magnetic field emanating from the first human interface device;
  performing pattern matching of the sensor data against a generalized set of sensor data patterns using an inference model to obtain a type of user input, the type of user input being based on an actuation of a second human interface device that is known to the data processing system, and the actuation of the second human interface device never having been performed;
  identifying an operation to be performed based on the type of the user input; and
  performing the operation.

14. The method of claim 13, wherein the first human interface device is a passive device comprising:
  a magnet; and
  an attachment element adapted to attach the magnet to a user of the data processing system.

15. The method of claim 13, wherein the data processing system is unable to map any actuation of the first human interface device to any operations performable by the data processing system without use of the inference model.

16. The method of claim 13, wherein the sensing system is not operably connected to the first human interface device, and the sensing system comprises a sensing element positioned with a static location while the sensor data is obtained.

17. The method of claim 16, wherein the sensing element is adapted to monitor variations in the magnetic field emanating from the first human interface device over time at the static location and report the sensor data to the sensing system based on the variations, and the variations being due to movement of the first human interface device with respect to the static location.

18. The method of claim 17, wherein the sensor data indicates motion of a source of the magnetic field emanating from the first human interface device, the motion being used to identify:
  a position of the first human interface device at a point in time;
  an acceleration of the first human interface device at the point in time; and
  a motion path of the first human interface device over a period of time starting at the point in time.

19. The method of claim 13, wherein the inference model is based on training data, the training data being based on:
  an identifier for the type of the user input; and
  a sensor data pattern obtained while the first human interface device is actuated by a user prompted to perform the actuation in a predetermined manner, the sensor data pattern being associated with the identifier in the training data.

20. The method of claim 19, wherein the prompt is presented to the user with a graphical user interface, the graphical user interface displaying:
  a representation of the actuation of the second human interface device;
  a representation of an actuation of the first human interface device; and
  a description for interpreting the representation of the actuation of the first human interface device.

* * * * *